Oct. 29, 1957 G. W. SPENCER 2,811,713

SIGNAL PROCESSING CIRCUIT

Filed March 9, 1954 2 Sheets-Sheet 1

Inventor:
George W. Spencer,
by Charles M. Hutchins
His Attorney.

Oct. 29, 1957 G. W. SPENCER 2,811,713

SIGNAL PROCESSING CIRCUIT

Filed March 9, 1954 2 Sheets-Sheet 2

Inventor:
George W. Spencer,
by Charles M. Hutchins
His Attorney.

1

2,811,713

SIGNAL PROCESSING CIRCUIT

George W. Spencer, North Syracuse, N. Y., assignor to General Electric Company, a corporation of New York Application March 9, 1954, Serial No. 415,050

9 Claims. (Cl. 340—347)

Figure 1:
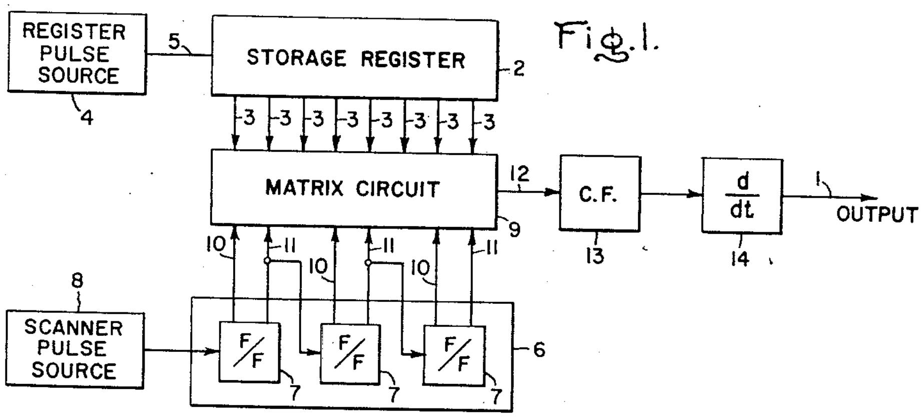

This invention relates to signal processing arrangements and particularly to an arrangement for sampling a plurality of stored information in a manner to produce a train of desired output signals.

In the fields of computation, data transmission, communication, instrumentation, etc., it is often desirable to obtain the serial read out of a plurality of information available in several parallel storage circuits. Existing systems for serving this purpose have been found to be relatively unreliable and complicated, particularly when large numbers of storage circuits were involved. Thus a system which is versatile enough to accommodate a large number of storage circuits with a minimum of circuitry and capable of delivering output information at high operating speeds is highly desirable.

Accordingly it is an object of this invention to provide an improved signal processing arrangement.

It is a further object of this invention to provide an improved system for converting signal information from one form to another.

It is another object of this invention to provide an improved pulsed sequential scanner system.

It is another object of this invention to provide an improved system for sequentially sampling a plurality of input information available in binary form.

It is another object of this invention to provide an improved system for combining a plurality of bi-stable circuit outputs to derive unique control signals.

It is still another object of this invention to provide an improved pulse forming system.

In accordance with one embodiment of the invention a sequential scanner is provided for reading out stored information and producing a series of pulses indicative of the stored information. The information stored in a binary storage or count register is sequentially scanned by a chain of triggered flip-flop multivibrators in a system employing a plurality of sensing networks each responsive to the signal developed at various output electrodes of the scanning chain and a signal at one of the output electrodes in the storage register. The scanning chain is triggered as a counter by pulses supplied from a scanner pulse source, and at only one period during the complete scanning cycle is a selected combination of the output electrodes sensed by one sensing network capable of rendering the sensing circuit operative to yield an output pulse. The resultant output pulse may then be differentiated and one or both of the resulting differentiated pulses used to obtain a required control action.

Figure 3:
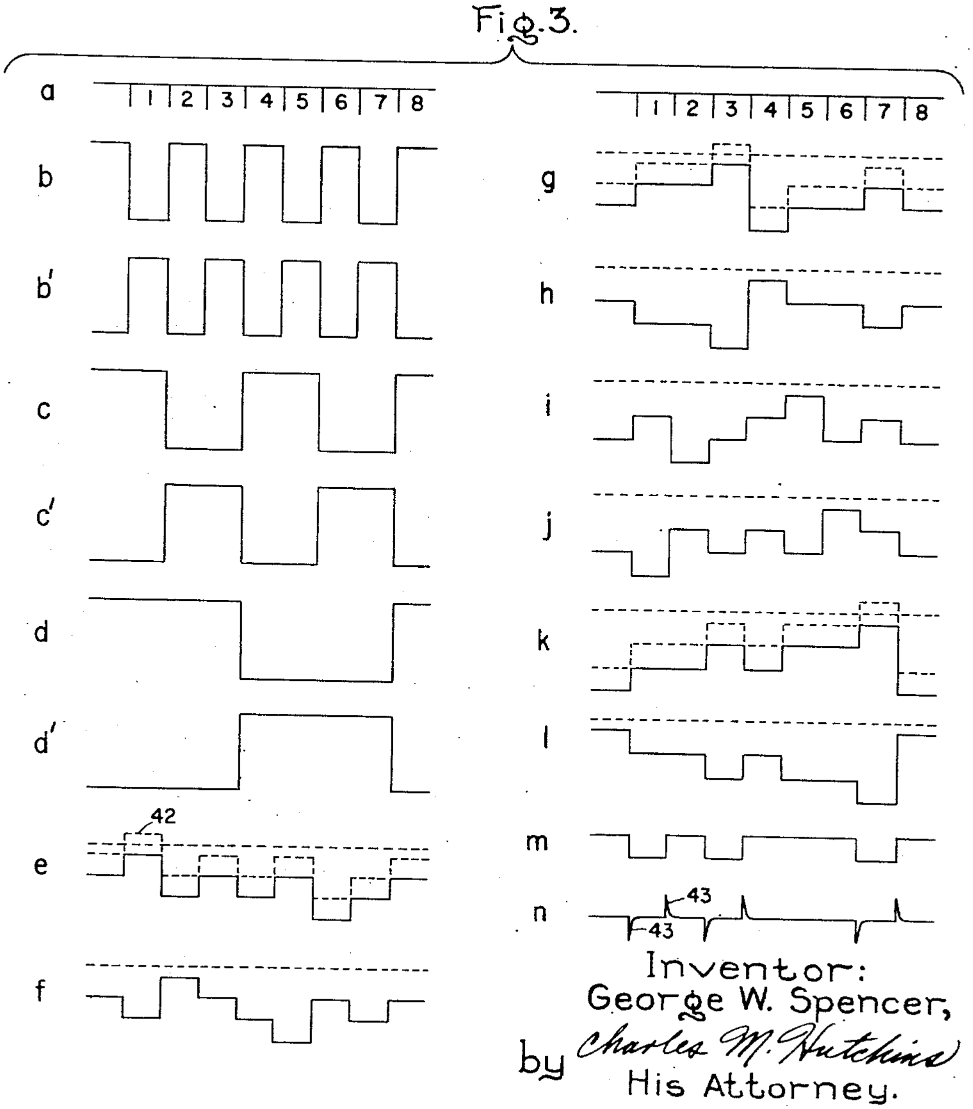
Figure 2:
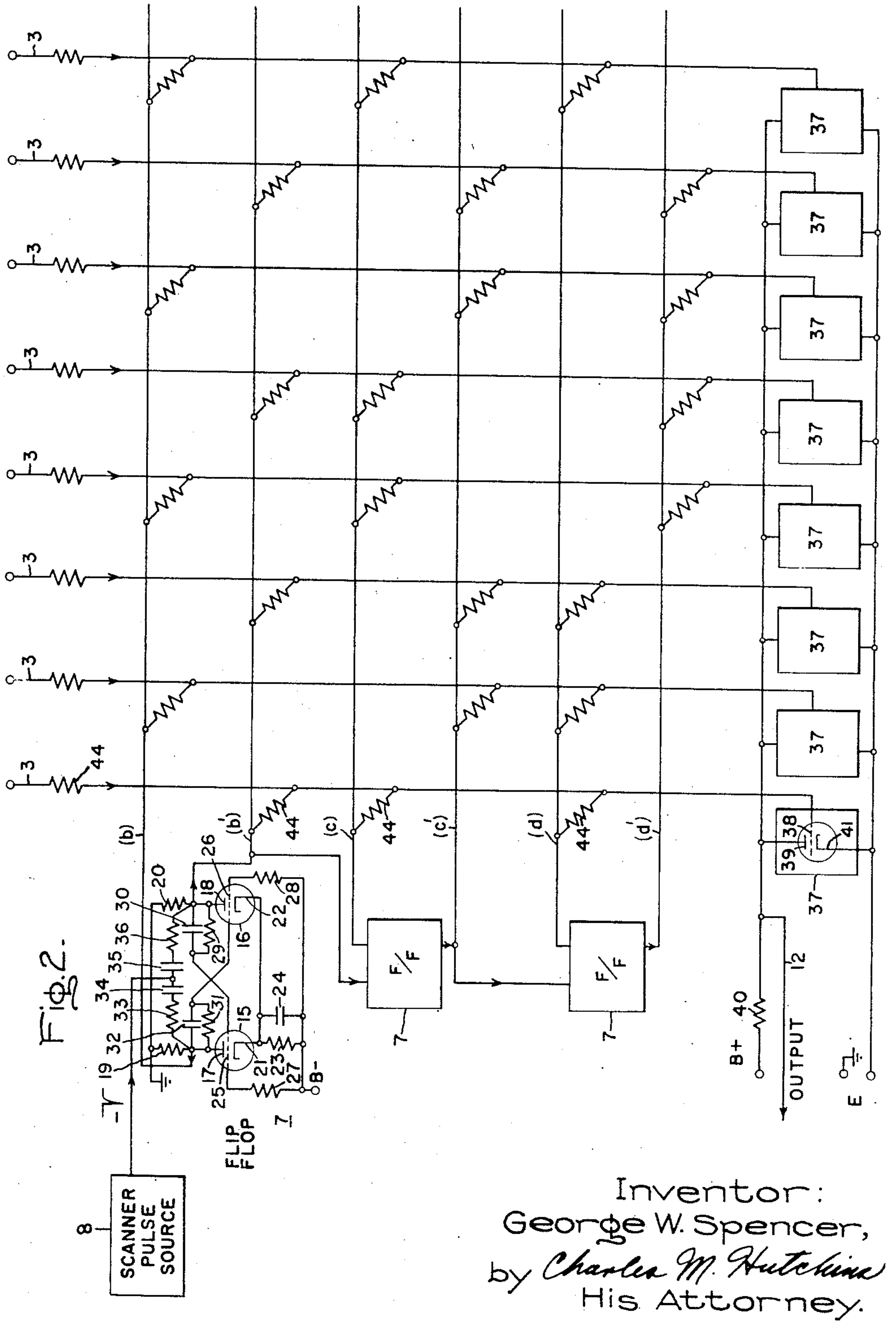

The novel features which I believe to be characteristics of my invention are set forth with particularity in the appended claims. My invention itself, however, both as to its organization and method of operation together with further objects and advantages thereof may best be understood by reference to the following description taken in connection with the accompanying drawings in which Figure 1 illustrates in block diagram form the features of the present invention, Fig. 2 shows a circuit diagram,

2 partly in block diagram form, of one embodiment of the invention, and Fig. 3 illustrates graphically various wave forms useful in explaining the operation of the arrangements of Figures 1 and 2.

Referring to Figure 1 there is shown an arrangement for producing a pulse pattern at an output lead 1 which is related to the binary information stored in a storage register 2. The binary register 2 may comprise a plurality of bi-stable multivibrators interconnected so as to produce an "on" or "off" binary type signal at the various output leads 3 depending upon the number of pulses transmitted from a pulse source 4 over the lead 5 to register 2 for storage. In the particular embodiment illustrated in Figure 1, the register 2 comprises a scale of 256 type binary register, employing eight cascaded multivibrators to each of whose output leads respective output leads 3 are connected. For further details of the operation of this form of register, reference can be made to Patent 2,591,931, issued to I. E. Grosdoff on April 8, 1952. Depending upon the number of pulses transmitted from the source 4 to the register 2 and stored therein, "on" or "off" voltage conditions are established at the various output leads 3 in a related pattern. In one particular embodiment the "on" condition corresponded to a negative voltage of 100 volts whereas the "off" condition corresponded to a negative voltage of 200 volts, or 100 volts less positive than the "on" condition. In order to obtain an output signal at 1 indicative of the voltage conditions at the output leads 3 and hence of the number of pulses stored in the binary register 2, a scanning circuit comprising a chain of triggered flip-flop multivibrators is provided. Briefly the scanning circuit 6 comprises a series of cascaded multivibrators or flip-flops 7 triggered in response to pulses available from source 8 and adapted to provide with the aid of a matrix circuit 9 a sequential sampling of the voltage conditions existing at the various output leads 3. The matrix circuit 9 comprises a plurality of sensing and adder circuits. Each of the adder circuits is adapted to combine the potential developed at a combination of three electrodes 10 and 11 in the scanning chain and the potential developed at one of the output leads 3 in the storage register in a manner to cause an associated sensing circuit to become operative and provide an appropriate output signal. The matrix circuit 9, the scanning chain 6, and the register output leads 3 are interconnected such that as the scanning chain is triggered under control of the scanner pulse source 8, only at one non-overlapping period during the complete scanning cycle is any selected combination of the output electrodes 10 and 11 combined by one adder circuit able to cause its associated sensing circuit to operate and produce an output signal. Only if an "on" signal condition exists at the associated output lead 3, does the sensing circuit operate to produce an "on" output pulse for application to cathode follower circuit 13. The output of cathode follower 13 in turn is differentiated by circuit 14 to yield positive and negative going pulses on the output lead 1. In certain applications, the output of circuits 9 or 13 may be used directly for control purposes. If the register output voltage available on lead 3 was in the "off" signal condition, the associated sensing circuit contained in 9 would not have been rendered operative and consequently an "off," that is no output pulse, would have been provided at lead 12. By a unique selection of connections for each of the plurality of sensing circuits contained in 9, each of the register output leads is caused to be time sampled in sequence and an appropriate signal provided at the corresponding time position in the output signal pulse train depending upon the "on" or "off" signal condition existing at the associated output lead 3.

Referring to Figure 2 the detailed operation of the block diagram of Figure 1 is explained. It is assumed for purposes of explanation that the number 1 is stored in the binary register 2 such that the first output lead 3, reading from left to right, has an "on" voltage of say —100 volts developed thereon and the remaining leads 3 have an "off" voltage of say —200 volts. It is desired to read this stored information and provide a corresponding pulse train or pulse output at lead 12. To sequentially sample the voltage condition at the eight output leads 3, a scale of eight binary counter 6 is employed. This counter comprises three multivibrators 7 connected in cascade and arranged to be operated by the scanner pulses supplied by source 8.

Each of the multivibrators 7 may comprise a pair of electron discharge devices 15 and 16 connected to operate as a bi-stable multivibrator. By itself, this multivibrator arrangement constitutes a conventional scale of two counter circuits. Each of the devices 15 and 16 has an anode electrode 17 or 18 connected through respective load resistors 19 or 20 to ground, and its cathode 21 or 22 connected through a common, parallel connected, resistance-capacitance load circuit comprising elements 23 and 24 connected to a source of B-potential. The input electrodes 25 and 26 are coupled by respective grid leak resistors 27 and 28 to the source of B-potential. The input, or control electrode of device 15 is also connected through the shunt combinations of resistance 29 and capacitance 30 to the anode electrode of device 16. Likewise the control electrode of device 16 is connected through the parallel combination of resistance 31 and capacitance 32 to the anode electrode of device 15. The circuit is thus made regenerative and only one of the electron discharge or electronic amplifying devices will be maintained in a conducting condition at any instant. To change the conduction status of either device, a negative signal is applied to the control electrodes 25 and 26 of both devices through respective resistance capacitance networks comprising elements 34, 33, 31, 32 and 35, 36, 29, 30. As the conduction state of the two devices changes, the output or anode electrode of the device passing from conduction to non-conduction will vary from say a minus 200 volts potential to a minus 100 volt potential determined by the multivibrator circuit arrangement. The input to the second counter stage 7 is taken from a connection on the anode electrode of device 16 in the first counter stage and is applied in parallel to the control or input electrodes of the devices constituting the second stage through short time constant circuits similar to that of 31, 32, 33, 34, and 29, 30, 35, 36 of the first stage. Finally, the input to the last or third counter stage 7 is taken from a connection on the anode electrode of device 16 of the preceding counter stage and applied in parallel through respective short time constant circuits, similar to that previously described, to the input electrodes of the final counter stage. As hereinafter described, the quiescent or zero period in the scanning sequence of the counter chain 6 exists when all devices 16 of all three counter stages are conducting, and devices 15 non-conducting. In tracing a complete cycle of counter operation from the zero state, the first input pulse applied from the source 8 to the first counter stage 7 changes the conduction status of devices 15 and 16 of only the first stage. The second pulse causes the devices of both the first and second stages to change their conduction status, the third pulse only affects the first stage, the fourth affects all three stages, etc. This process repeats for the last four pulses of the scanning cycle before the last stage returns to its initial conduction status. Upon application of the last of eight pulses from the source 8, the same conduction status of the various devices in the counter chain is obtained as existed when the counter 6 was in the zero state. Thus the counter chain is of the scale of 8 form. For further details of the operation of the scaler type multivibrator circuit shown in Fig. 2, reference can be made to Patent No. 2,630,969, entitled "Decimal Counting and Indicating System," to L. M. Schmidt, dated Mar. 10, 1953, and assigned to the same assignee as the present invention.

The type of output voltages developed at the output leads 10 and 11 of each of the scanner flip-flops can be readily seen by reference to Figure 3 of the drawings wherein it is shown that for every successive scan pulse in a series of eight pulses transmitted by source 8 to the scanning circuit 6, the combination of voltage conditions existing at the respective output leads 10 and 11 is caused to change. Since only the negative going output signals developed at the lead of the first scanning stage 7 are able to effect the conduction status of the devices in the second stage, the output leads of the second stage change voltage only once for every two pulses transmitted by source 8. Finally the last flip-flop 7 in the scanner chain changes voltage at its output leads 10 and 11 once for every four pulses transmitted by source 8. These voltage conditions are illustrated in Fig. 3 where curve *a* indicates the successive pulses transmitted by source 8, *b*, *b′* indicate the voltage wave forms developed at respective output leads 10 and 11 associated with the first flip-flop circuit in the scanner chain, and curves *c*, *c′* and *d*, *d′* indicate the corresponding voltages developed at each of the output leads of the second and third scanner stages 7. After eight pulses have been transmitted by source 8, the cycle of wave forms is repeated.

By connecting each sensing circuit or device of Fig. 2 by means of resistance adder circuits or networks to a respective unique combination of three selected output leads 10 and 11, each from a different stage of the scanner circuit, and to a respective storage register output lead 3, a resulting average voltage is developed which is adapted to cause each of the sensing devices to provide an output signal on lead 12 corresponding to the information appearing at the associated output lead 3. Each of the sensing circuits 37 comprises an electron discharge device having its anode electrode 39 connected through a common load resistor 40 to a source of B+ potential and its cathode electrode 41 connected to a common source of bias potential E. The bias voltage is selected such that in the absence of a predetermined level of voltage appearing at the input electrode 38, the sensing device 37 is held in a non-conductive state. If, however, the average voltage previously mentioned and developed at the input electrode 38 is of the proper value, the sensing device 37 conducts to produce a negative going output signal on the output lead 12.

In order that each of the sensing devices may contribute uniquely to the pulse train developed at the output lead 12, a unique arrangement of sensing and adder circuits is employed. The arrangement is selected to avoid any ambiguities in reading the information from the storage register 2. The manner in which the selection is made can be readily seen by reference to Figure 3*e* which indicates the change in the voltage waveforms *b′*, *c*, *d*, associated with the first sensing circuits for the various time intervals of the count of eight scan by scanner circuit 6. It should be noted that this resulting voltage is maximum only for the interval occurring between the first and second scan pulses of a scanning cycle. If the bias voltage E is established as the cutoff potential level for the first sensing device 37, then if an "on" voltage appears on the first output lead 3, the average voltage will rise as indicated by 42 in dotted form, and cause the first sensing device to conduct and deliver an output signal on lead 12. If, on the other hand an "off" voltage appears on the first output lead 3, the average voltage will remain below the cutoff level established by the bias source and no output signal will be delivered to lead 12.

The waveforms *f*, *g*, *h*, *i*, *j*, *k* and *l* indicate the change in the average voltage level occurring at the input electrode 38 of each of the remaining adder devices 37. It should be noted that the selection of connections shown in Figure 2 results in each of the sensing devices being successively biased during a respective non-overlapping scan interval established by the scanner pulse source 8 to become operative should an "on" condition exist at the respective output lead 3 associated with the sensing device. Depending on the speed with which pulses are supplied by source 8, therefore, the information contained in the storage register 2 is sequentially sampled and a pulse train delivered over output lead 12 which is indicative of the information sampled. Assuming the "on," "off" voltage conditions existing at the output leads 3 are such that the first, third, and seventh sensing devices 37 are rendered conductive during their respective operating periods of the scan cycle to deliver an output signal on lead 12, the resultant pulse train available at this output lead is as shown in Figure 3*m*. If the "on," "off" voltage conditions of the output leads 3 had been any different, then the pulse train shown in *m* would be altered correspondingly. The pulse train available on lead 12 is passed through a cathode follower circuit 13 to the differentiating circuit 14. The differentiating circuit 14 is of any well-known variety which operates to produce positive and negative going spikes 43 corresponding to the positive and negative going portions of the pulse train shown in *m*. The differentiated pulses can then be employed to start and stop, or control in any other related manner the operation of apparatus in accordance with the "on," "off" voltage conditions existing on the output leads 3.

It should be noted that the arrangement of Figure 2 employs three scanner flip-flops which produce a scanning period of eight intervals for successively sampling each of the eight output leads 3 for their information. To accommodate the eight output leads 3, four voltage levels were averaged in order to properly control the sensing devices. The invention, however, is versatile enough, however, to accommodate greater or lesser amounts of information than that capable with the arrangement shown in Figure 2. For example it can be said that for 2*n* signal output leads, where *n* is any integral integer, 2*n* sensing devices are required, or one for each output lead. To scan 2*n* output leads, *n* scanner flip-flop circuits are required. Furthermore, *n* unique scanner output voltages need to be combined with each signal storage output voltage for controlling the operation of each sensing circuit.

While the scanner circuit of Fig. 2 was shown to comprise flip-flop circuits of the electron-discharge device type, the use of other apparatus capable of sequentially delivering different patterns of binary signals over a plurality of output leads are within the broad scope of this invention. Furthermore, while in Fig. 2 the invention has been applied specifically to a binary storage register, it is obvious that the invention is applicable to any system capable of binary information interpretation, such "on, off" switch positions, etc.

While a specific embodiments has been shown and described, it will, of course, be understood that various modifications may yet be devised by those skilled in the art which will embody the principles of the invention and found in the true spirit and scope thereof.

What I claim as new and desire to secure by Letters Patent of the United States is:

1. In combination at least two normally inoperative controllable electronic devices each comprising an input and an output electrode, at least two sources of binary signals, said signals occurring in two amplitude states, a source of at least two simultaneously occurring step waves each having a different amplitude versus time wave shape characteristic, means for applying said step waves to respective input electrodes of said devices, said devices responsive to a predetermined amplitude of their respectively applied waves to become biased recurrently to their threshold of operation for non-overlapping periods of time related to the duration of said predetermined amplitudes, means for applying said binary signals to respective input electrodes, said devices responsive to a predetermined one of said states of their respectively applied binary signals only during their related threshold operating periods to produce an output signal at their respective output electrodes.

2. In combination two normally inoperative signal sensing devices each comprising an input and an output electrode, a source of a plurality of parallel-stored binary signals, said signals occurring in two amplitude states, means for serially reading out said stored signals comprising a source of two step waves, each having at least three differently recurring amplitude levels, means for applying each of said waves to a respective input electrode of said devices, said devices responsive to a predetermined amplitude of their respectively applied waves to become biased to their threshold of operation for periods of time related to the duration of said predetermined amplitudes, means for applying said binary signals to respective input electrodes, said devices responsive to a predetermined one of said states of their respectively applied binary signals only during their related threshold operating periods to produce an output signal at their respective output electrodes, and a common load circuit connected to said output electrodes.

3. In combination three normally inoperative controllable electronic devices each comprising an input, and an output electrode, a source of three binary signals, said signals occurring in two amplitude states, a source of three recurrent step waves, each of said waves having an amplitude characteristic differently variable within each period of recurrence in discrete steps between at least three amplitude levels, means for applying each of said waves to an input electrode of a respective one of said devices, said devices responsive to a predetermined amplitude step of their respectively applied waves to be recurrently biased to a less inoperative condition for non-overlapping periods of time related to the duration of said predetermined amplitudes, means for applying said binary signals to respective input electrodes, said devices responsive to a predetermined one of said states of their respectively applied binary signals only during their related threshold operating periods to produce an output signal at their respective output electrodes.

4. An arrangement for producing a group of serially occurring pulses related to a plurality of parallel stored binary information, comprising a scanning potential generator, said generator adapted to provide a plurality of different, simultaneously occurring signals each occurring on a respective one of a plurality of scanning output leads in which each of said signals has an amplitude characteristic which is differently variable with time, a plurality of normally inoperative sensing devices, equal in number to said signals, means for applying each of said different signals to a respective one of said devices to successively render a different one of said devices less inoperative for a duration of the predetermined amplitude of its applied signal, each of said devices responsive only during its less inoperative state to a respective one of said binary information to become operative and deliver an output signal.

5. In combination a pair of normally inoperative signal sensing devices, each of said devices comprising an input circuit and an output circuit, a source of binary signals occurring in two amplitude states, a source of a plurality of recurrent step signals, said source comprising at least two binary scalers connected in cascade, means for triggering said scalers to provide a plurality of simultaneously occurring output signals, means for adding said output signals to provide a plurality of different step signals wherein each step signal has a different amplitude versus time wave shape, means for concurrently applying a different step signal from said source to each of said input circuits, each of said devices responsive to a predetermined amplitude of its respective applied signals to become less inoperative for a period of time related to the duration of said predetermined amplitude of said step signal, means for applying separate signals from said binary signal source to each of said input circuits, each of said devices responsive to a predetermined one of said states of its respective applied binary signals only during its less inoperative period to produce an output signal at its output circuit.

6. In combination a pair of normally inoperative signal sensing devices, each of said devices comprising an input circuit and an output circuit, a source of a plurality of binary signals occurring in two amplitude states, a source of a plurality of signals, said source comprising at least two binary scalers connected in cascade, a source of recurrent triggering signals, said binary scalers responsive to said triggering signals for providing a plurality of output signals, and means connected to each of said binary scalers for adding said output signals to provide a plurality of recurrent step signals each having a different amplitude versus time wave shape, means for concurrently applying a different step signal to respective ones of said input circuits, each of said devices responsive to a maximum amplitude of its respective applied signals to become less inoperative for a period of time related to the duration of said maximum amplitude of said step signal, means for applying separate signals from said binary signal source to each of said input circuits, each of said devices responsive only during its less inoperative period to a predetermined one of said states of its respective applied binary signals to produce an output signal at its output circuits.

7. In combination, a plurality of normally inoperative controllable electronic devices, said devices each comprising an input electrode and an output electrode, a source of a plurality of parallel-stored binary signals occurring in at least two amplitude states, a source of a plurality of recurrent step waves, each of said waves having an amplitude characteristic differently variable within each recurrence period of time in discontinuous steps between at least the same three amplitude levels, means for applying each of said waves to a respective one of said input electrodes, said devices each responsive to a predetermined amplitude level of said applied wave to be recurrently biased to a less inoperative condition for a period of time related to the duration of said predetermined level, means for applying each of said binary signals to a respective input electrode, said devices each responsive to a predetermined one of said states of an applied signal only during its less inoperative condition to provide an output signal at its respective output electrode.

8. An arrangement for providing a signal which has a step amplitude function variable with time comprising a source of recurrent trigger pulses, a plurality of binary scaling units connected in cascade, each of said units having two output circuits, said binary scaling units responsive to said trigger pulses for providing respective binary output signals on each of said output circuits, an electrical circuit responsive to each of said output signals to provide a plurality of step signals each having a different amplitude characteristic variable between at least three predetermined amplitude levels at the recurrence rate of said trigger signals, and means for utilizing said separate step signals.

9. In combination, $2n$ normally inoperative signal sensing arrangements where $n$ is any integer other than 1, each of said arrangements comprising an input circuit and an output circuit, a source of $2n$ information signals each occurring in at least two amplitude states, a scaling device comprising $n$ binary scaling units connected in cascade, said device providing $2n$ output pulses, a resistance matrix for adding said output pulses in a manner to provide $2n$ simultaneously occurring step waves each having a different amplitude versus time characteristic, said step waves successively acquiring the same threshold amplitude value, means for applying one of said information signals and one of said step waves to a respective one of each of said input circuits, each of said sensing arrangements responsive to one of said states of its applied information signal only during said threshold level of its applied step wave to produce an output signal at its output circuit.

References Cited in the file of this patent

UNITED STATES PATENTS

| | | |
|---|---|---|
| 2,570,716 | Rochester | Oct. 9, 1951 |
| 2,590,950 | Eckert | Apr. 1, 1952 |
| 2,612,563 | Dain | Sept. 30, 1952 |
| 2,677,725 | Schuler | May 4, 1954 |